Figure 4:
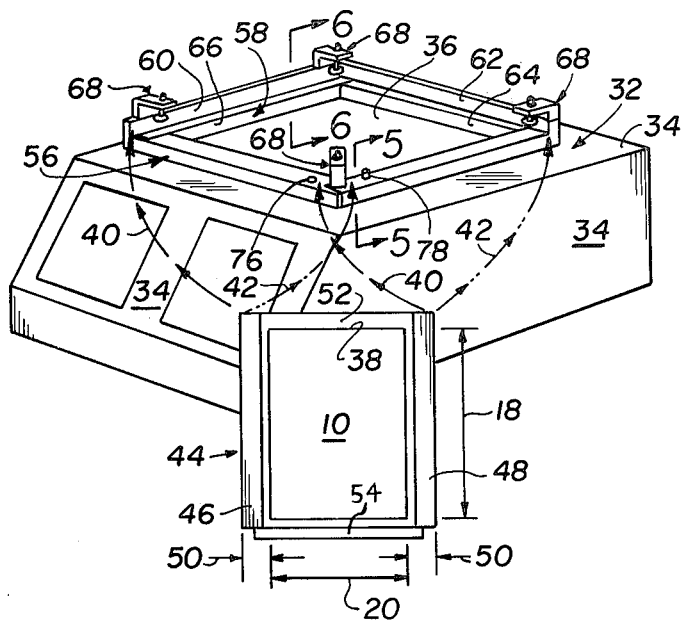

United States Patent [19]

Volent et al.

[11] 4,185,915

[45] Jan. 29, 1980

[54] METHOD OF PRODUCING MULTIPLE IMAGE FORMATS

[76] Inventors: Ivan Volent, 1600 Center Ave., Fort Lee, N.J. 07024; Saul Fermaglich, 15 School House Rd., Woodcliff Lake, N.J. 07675

[21] Appl. No.: 879,153

[22] Filed: Feb. 21, 1978

[51] Int. Cl.² .................................................. G03B 27/32
[52] U.S. Cl. ........................................ 355/77; 355/44; 355/74
[58] Field of Search ....................... 355/77, 74, 44, 45, 355/20

[56] References Cited

U.S. PATENT DOCUMENTS

| | | | |
|---|---|---|---|
| 3,286,586 | 11/1966 | Whitney | 355/44 X |
| 3,588,248 | 6/1971 | Freund et al. | 355/74 |
| 3,945,721 | 3/1976 | Corcoran | 355/44 X |

Primary Examiner—Richard A. Wintercorn
Attorney, Agent, or Firm—Bauer & Amer

[57] ABSTRACT

In relation to a primary end use in nuclear medicine, namely, the recording of multiple images in a so-called dynamic study of a patient using a gamma camera wherein said multiple images are typically photographically reproduced on a single sheet of film in an appropriate format, the within inventive method obviates the need to modify the angular orientation of the images projected onto the image-receiving film sheet incident to providing same with the proper format or display position, and instead contemplates the novel alternative of properly pre-positioning the film sheets. Among other advantages and benefits is a noteworthy simplification in the construction and operational requirements of the image-projecting lens assembly of the apparatus being used to produce the photographic record.

4 Claims, 10 Drawing Figures

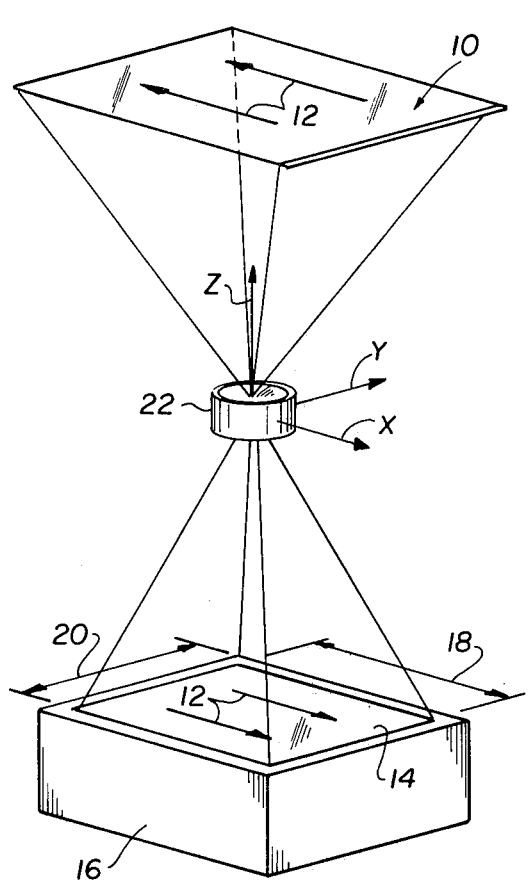
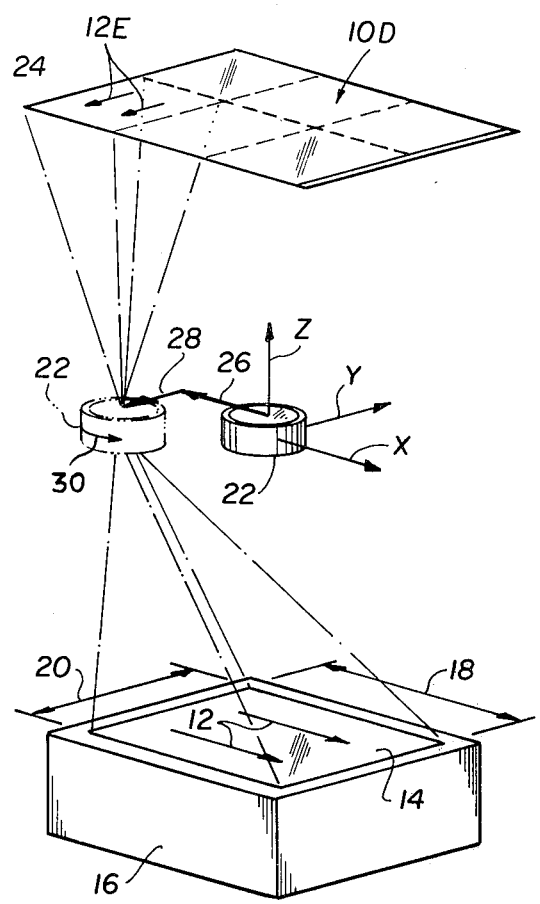
FIG.1 PRIOR ART          FIG.2 PRIOR ART
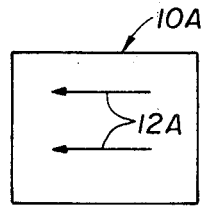
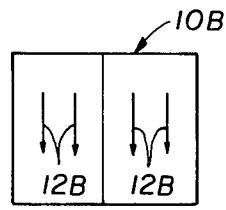
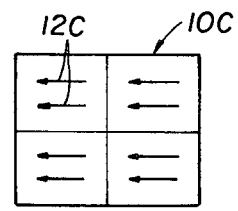
FIG.3A            FIG.3B            FIG.3C
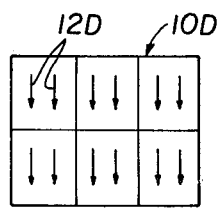
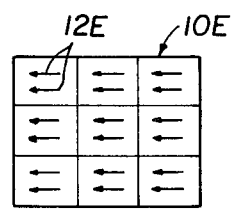
FIG.3D            FIG.3E

METHOD OF PRODUCING MULTIPLE IMAGE FORMATS

The present invention relates to improvements for an information programmer of the well known type having significant utility when used in conjunction with so-called gamma and/or Anger-type cameras, in that the programmer records on a single film sheet or similar substrate a significant number of images in a significant number of appropriate different formats. The improvements thereto which, as noted, comprise the invention, more particularly reside in a novel record-producing method or procedure, capable of practice by a number of different constructions or embodiments in which there has been effectively obviated any need for complexity in the image-transferring or projecting lens assembly.

Already well known are different kinds of programmers for processing for photographic reproduction image-type information in selected numbers in appropriate display positions or formats. Thus, the programmer of U.S. Pat. No. 3,852,602 is essentially electronic, that of U.S. Pat. No. 3,503,317 mechanical, while that of U.S. Pat. No. 4,027,315 is a combination thereof. These programmers, however, all have in common a lens assembly for projecting each photographically recorded image from a monitor display screen, typically a gamma camera oscilloscope screen, to a remote display station, at which is located the sheet of film on which the images are reproduced. Depending upon the appropriate format for proper image display or presentation, each image is projected in a correspondingly appropriate orientation. In practice, since the lens assembly is used in the projection of the image onto the remotely located film sheet, it is also used in providing an appropriate rotational position or angular orientation to the image.

Broadly, it is an object of the present invention to provide a simplified method of producing multiple image formats and thereby eliminating the complexity and other such shortcomings of the prior art. Specifically, it is an object to achieve in a novel alternate non-optical procedure a function heretofore typically achieved "optically" by the lens assembly of the record-producing apparatus hereof, thus allowing for marked and significant simplification in the construction and operational requirements of this type apparatus.

The referred to procedure or method, which demonstrates objects and advantages of the present invention, is concerned with effectively conforming the orientation of multiple images to a rectangular film substrate incident to the reproduction of these multiple images on said rectangular film substrate in said conformed orientation, and includes as a preliminary step the displaying, in sequence, of a selected number of images destined for reproduction on the film substrate in a uniformly similar orientation on a display screen. An image display station is established at a remote or clearance position from said display screen, and it is to this station that each said image is projected while the orientation thereof in which it was presented on the display screen is maintained. However, by proper selection of one of two orientations of a perpendicular relation to each other for the film substrate during the positioning thereof in image-transferring relation to said projected images at said image display station, the image orientation is correspondingly conformed to the long or short dimension of the rectangular film sheet, whichever is appropriate for the selected format. There is therefore proper orientation of the images on the film record, but not as a result of an optical function performed by the image-projecting lens assembly, thus rendering it unnecessary to embody the lens assembly with optical elements or the like to provide this function.

Figure 5:
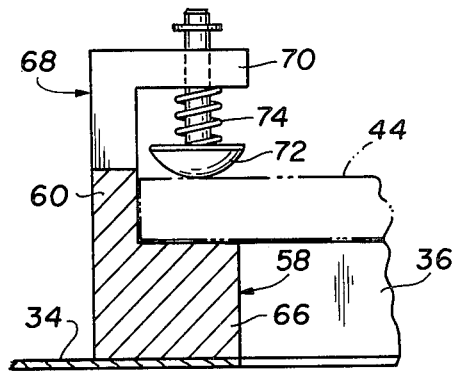
Figure 6:
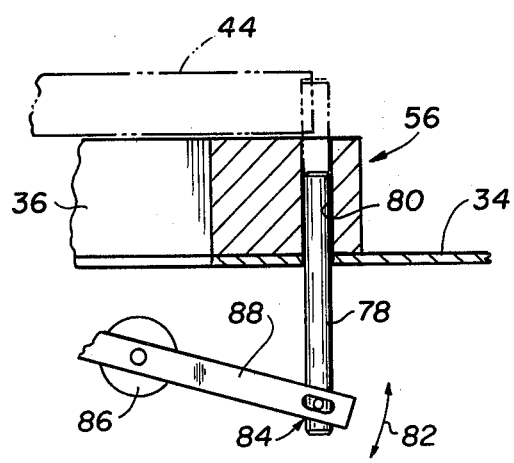

The above brief description, as well as further objects, features and advantages of the present invention, will be more fully appreciated by reference to the following detailed description of a presently preferred, but nonetheless illustrative embodiment for practicing the within inventive method, when taken in conjunction with the accompanying drawings, wherein:

FIGS. 1 and 2 are diagrammatic views illustrating the prior art method of producing multiple image photographic records;

FIGS. 3A–E, inclusive, illustrate different formats of said photographic records;

FIGS. 4–6 illustrate an exemplary apparatus for producing multiple image formats such as those illustrated in FIGS. 3A–E, which practices an improved method demonstrating objects and advantages of the present invention. More particularly, FIG. 4 is a perspective view of the portion of said apparatus defining an image display station, illustrating how a single sheet of film can be positioned at said station in either one of two possible orientations; and FIGS. 5 and 6 are side elevational views, on an enlarged scale, and in section taken respectively along lines 5—5 and 6—6 of FIG. 4, illustrating further structural features which facilitate the practicing of the within inventive method.

Illustrated in the drawings and, more particularly in FIGS. 3A–E, are a few samples of single sheets of film, designated 10 followed by the letter associated with the particular figure, of what will be understood to be a record containing a photographed image. For purposes of this description, the image is represented by the double arrow individually and collectively designated 12 and also followed by the letter of the particular figure. As further understood, said image is displayed on a display screen, such as a gamma camera oscilloscope (see display screen 14 of FIGS. 1 and 2) and reproduced photographically in a delineated area of each film sheet 10A-E. As clearly illustrated in FIGS. 3A–E, the presentation of each film sheet 10A-E differs in the number of images 12A-E that are presented, and also in the size thereof, these differences in number and size representing the "format" of the particular film sheet. Thus, in the respective FIGS. 3A–E, film sheet 10A is representative of a format of a single image 12A; sheet 10B of a two-image format; film sheet 10C of a four-image or frame format; sheet 10D of a six-frame format; and finally sheet 10E of a nine-frame format. Although not limited to use in the medical field and particularly with gamma cameras, the referred to film records 10A-E are particularly useful in this area, and the invention therefore will be described in particular connection with this end use with the understanding, of course, that the invention is not to be limited thereto.

It is to be further understood, still by way of background, that a gamma camera, such as described for example in U.S. Pat. No. 3,852,602, typically is operatively associated with an oscilloscope, diagrammatically designated 16 in FIGS. 1,2. As already noted, oscilloscope 16 includes a display screen 14 for displaying what is typically a rectangular shaped image. As illustrated, screen 14 also typically is of a rectangular shape, and thus has a long dimension 18 and a somewhat shorter dimension 20. The selection of the double arrows 12 as representative of the image being displayed and photographed during the production of the film records 10A-E is intended to make note of two aspects of the image. First, that because of its nature in some instances the image might have greater length in one orientation or direction than in the other, this being signified by the pointing direction of the arrows 12. The other attribute is that the direction of the arrow indicates the orientation of the image 12 in its different presentations in the drawings. Thus, for example, in FIG. 1, the image represented by the arrows 12 on the display screen 14 is oriented left to right, whereas the film sheet 10 associated therewith receives the projection of said image, as will be described in detail subsequently, in an orientation that is 180 degrees out of phase therewith and thus is perceived from right to left.

In the prior art there are already well known numerous models of apparatus for producing multiple image film records of images previously displayed on an oscilloscope display screen, or an equivalent display. These known devices, among other changes, modify the size and location of the sequentially displayed images, incident to producing a multiple image sheet of film 10, in one of the exemplary formats of FIGS. 3A-E. To this end, these devices characteriscally include an image-projecting lens assembly, generally designated 22, of known construction and mode of operation, and thus not requiring any detailed description herein. Said typical lens assembly 22 may, for example, be similar to that described in prior U.S. Pat. Nos. 4,027,315 and 3,852,602. As understood, lens assembly 22 is mounted for movement along the three axes X, Y and Z, as noted in FIGS. 1, 2. Additionally, the lens assembly 22 may also include a prism (not shown) such that in response to rotation thereof about the Z axis the projected image is correspondingly rotated in proportion to the angular degrees of the rotatable traverse of the lens assembly 22.

With the above understanding, reference should now be made to FIG. 2. Assume that it is desired to produce the six-frame film record 10D. This requires a minification of each projected image 12D so that it fits within an appropriately sized delineated area, which will be understood to be approximately one-sixth of the film sheet record 10D. Additionally, each image 12D must be appropriately positioned-located on the record 10D. Thus, again as is well understood, the first recorded image 12D should be reproduced in the upper lefthand corner, the second in the adjacent righthand corner, the third in the middle of the lefthand row, the fourth to the right of that, the fifth in the lower lefthand corner, and finally the sixth in the lower righthand corner. To provide the proper position location for the projected image, the prior art contemplates the movement of the lens system 22 the appropriate distances 26 and 28 along the respective axes X and Y.

An additional requirement in the production of the film sheet 10D having a six-frame format, and one that is particularly pertinent to the within inventive method, is that the projected image 12D, for its proper presentation in uncramped and properly spaced condition on the film record 10D, should be re-oriented 90 degrees or perpendicularly to the orientation in which it is displayed on the oscilloscope screen 14. In the prior art, this is achieved using a prism or other appropriate optical elements in the image-projecting device 22 by mounting said device for rotational movement 30, which effectively enables the projected image to be rotated through a proportional corresponding extent as the device 22.

As a significant contribution to apparatus for producing photographic records in multiple images in multiple formats, as hereinbefore described, and more particularly, as a significant contribution to the mode of operation thereof, it is contemplated according to the present invention to eliminate the need to provide a lens assembly capable of changing the angular orientation of the projected image, thus significantly decreasing the cost of said lens assembly, significantly simplifying the operation thereof, as well as providing other noteworthy advantages and benefits. The improved method of producing multi-image formats, as exemplified by the film records of FIGS. 3A-E, will now be described in connection with the structure more particularly illustrated in FIGS. 4, 5 and 6.

FIG. 4 illustrates a structure, generally designated 32, consisting primarily of walls, individually and collectively designated 34, which cooperate to define what will be understood to be the upper part of a housing for an apparatus capable of producing the records of FIGS. 3A-E. In other words, the apparatus will be understood to be similar, in a broad sense, to the apparatus presented diagrammatically in FIGS. 1 and 2. Structure 32 will be further understood to be supported by intermediate structure, not shown, in a clearance position from the image display screen 14. The upper horizontally oriented wall 34 is provided with an opening 36 which is designed to receive the film sheet 10 on which the images 12 are recorded. In this sense, therefore, opening 36 will be understood to define an image display station in that the image which was displayed on the screen 14 is also displayed at the station 36. Thus, by positioning film sheet 10 at station 36 in facing relation to the display screen 14, it is possible using the lens assembly 22 to project the image 12 from the screen 14 onto the film 10, and thus to produce a multi-image record in a selected format.

From a method or procedure point of view, it is convenient at this time to note that the within invention contemplates the positioning of the film sheet 10 in either one of two orientations which are perpendicular to each other, at the station 36. That is, one operative position for the film sheet 10 contemplates projecting its leading edge 38 into the station 36 in the direction from left to right, as viewed in FIG. 4, as along the arrows 40. The other operative position is one resulting from projecting film leading edge 38 into the station 36 from right to left, as viewed in FIG. 4, or in accordance with positioning movement 42. In this simple, yet highly effective manner, namely properly positioning the film 10 at the station 36, there is achieved a conforming orientation in the projected image 12 to the film sheet 10 that is appropriate for the format selected for reproduction on the film sheet 10. Using the example already described, sheet 10 would thus be moved into position, as along the path 42, at the station 36 to receive oriented image 12D thereof incident to producing the six-frame record 10D. If, on the other hand, a four-frame format 10C is required, in which format the projected image 12C is oriented 90 degrees in relation to image 12D, film sheet 10 will be moved into the display station 36 along the movement path 40.

To facilitate practicing the improved method of producing multiple image formats without the need to angularly rotate the projected image, as just described, the apparatus upper housing 32 should preferably be constructed as illustrated in FIGS. 4-6 and as will now be described, it being understood, however that other constructions which similarly provide an option in the positioning of the film 10 at the display station 36 are also within the contemplated scope of the invention. Said preferred construction includes substantially equalizing the two dimensions of the otherwise unequal sides 18 and 20 of the rectangular shaped film sheet 10. This is done by mounting the film sheet 10 in a frame or holder 44, the same, in addition to gripping the film sheet 10, having opposite sides 46 and 48 which add the dimension 50 to opposite sides of the short edge 20, thus providing an overall or total dimension which is approximately equal to the long side 18 together with the front and rear edges 52, 54 of the holder 44. The housing opening or display station 36 is, of course, sized to accommodate the combination film holder and film 44, 10.

To assist in guiding the framed film sheet 10 into position at the station 36, the opening, per se, at this station is bounded by a four-sided frame, generally designated 56. To assist in guiding the frame 44 during positioning movement 40, leg 58 of frame 56 is provided with an upstanding lip 60 which in maintaining contact with a cooperating edge of the frame 44 assists in guiding the same into position at the station 36. Movement along lip 60 occurs until abutment of front edge 52 of frame 44 against a similarly upstanding or vertically oriented lip 62 that is provided on leg 64 of the frame 56. As may be readily surmised, when positioning the frame sheet of film 10 along the positioning path 42, lip 62 then serves as a guide during this movement, while lip 60 serves as an effective stop limiting the extent thereof.

As is perhaps best shown in FIG. 5, when the framed film sheet 44 is in its proper position in spanning relation over the opening 36, its peripheral edges are supported from below by the inwardly extending legs of the L-shaped frame 56, as exemplified by leg portion 66 of leg 58 in FIG. 5. To assist in holding the framed film sheet 44 in this operative position, a group of four brackets 68 is provided, each strategically located at a corner of the station 36. As best illustrated in FIG. 5, each bracket 68 includes an overhanging leg 70 in which is mounted a vertically slidable gripping element 72 which is biased by the compression of a spring 74 in gripping or holding contact against the peripheral edge of the framed film sheet 44.

To promote proper or appropriate positioning of the framed sheet 44 in accordance with the format that is selected, a cooperating pair of lock-out pins 76 and 78 (see FIG. 4) are strategically located to allow positioning movement in a recessed position, but to prevent such movement in a raised position. Thus, the positioning of the framed sheet 44 in accordance with the format selection is related to the recessed or raised position of the pins 76, 78. More particularly, details of the construction and manner of using the pin 78 can be readily understood from FIG. 6, it being further understood that pin 76 is similarly constructed and used, but in tandem relation to pin 78. As illustrated in FIG. 6, pin 78 is slidably disposed in a bore 80 in frame 56 such that the upper end of pin 78 can assume an elevated position, as illustrated in phantom perspective, in response to a pivotal traverse 82 imparted to the pin at its lower end, as at 84. To impart this pivotal traverse, use is made of a rotary solenoid 86 mechanically connected, via link 88, to pin 78. Thus, in the positions of the pins 76 and 78 illustrated in FIG. 4, the recessed position of pin 76 permits positioning movement 40 for the framed sheet 44, while the raised position of pin 78 prevents positioning movement 42.

From the foregoing it should be readily appreciated that described herein is a method of producing all of the known formats of multiple image photographic records, such as exemplified in FIGS. 3A–E, but having significant improvements over known methods, particularly in the simplification of the construction and operational requirements of the image-projecting lens assembly of the apparatus used in the production of such records.

In the preceding description, the within inventive method was related to nuclear medicine and a specific end use with a gamma camera to provide dynamic studies, but it will be understood that such description was not intended to, and should not, impose limitations on the invention. For example, even as to the specific exemplary use in providing a so-called dynamic study, it is to be understood that it can also advantageously be used for static, whole body, and physiological function gated imaging. Also, while having noteworthy utility as an accessory to a gamma camera, it will be understood that the within inventive contributions are also compatible with any diagnostic imaging instrument with a video output display. It is, in fact, within the contemplated scope of the invention that the technology thereof be used in a free standing hard copy recording instrument with a built in video display and optical system, designed for both computerized tomography of an X-ray device and ultrasound scanner applications.

The reference in the description and claims to "film" and/or "film substrate" will be understood to include not only conventional photographic materials, but also standard X-ray film and single emulsion radiographic film compatible with X-ray film processors, of 5"×7", 8"×10" or other appropriate dimensions.

The within invention is also to be understood not to be limited to any of the specific formats referred to herein, since it is also applicable to a wide range of choices of available number and sizes of images to be recorded. For example and as noted herein, for typical dynamic studies up to 30 images in selected formats of 4, 6, 9, 12, 16, 20, 25, and 30 are the rule, but special studies are also known which require up to 64 images. Further, while there is an optimum desired correlation between image size and the number of recorded images for the selected film size, e.g. on 8"×10" X-ray film three popular choices of formats typically would be 105 mm size images, nine 90 mm size images, or sixteen 70 mm size images, as compared with corresponding choices on 11"×14" film of four 135 mm size images, nine 105 mm size images, or sixteen 90 mm size images this correlation between image size and number is not intended to, and should not, impose limitations on the invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method of conforming the orientation of multiple images to a rectangular film substrate incident to the reproduction thereof on said rectangular film substrate in said conformed orientation, said method comprising the steps of displaying in sequence each of a selected number of images destined for reproduction on said film substrate in uniformly similar orientations on a rectangularly shaped display screen, establishing an image display station in a clearance position from said display screen by locating at least two film-positioning rails in perpendicular relation to each other and in aligned relation to perpendicularly oriented sides of said rectangular display screen, projecting each said image while maintaining the orientation thereof from said display screen to said display station, and positioning a film substrate by linear movement thereof along one or the other of said film-positioning rails incident to selecting one of two orientations of a perpendicular relation to each other for said film substrate during the positioning thereof in image-transferring relation to said projected images at said image display station, whereby said selected film substrate orientation contributes to the positioning of the larger number of the multiple images in any format arrangement thereof in aligned relation to the long dimension of said rectangular film substrate.

2. The method of producing multiple image format film substrates as defined in claim 1 wherein said selection of said one of two orientations for said film substrate is facilitated by the blocking of movement of said film substrate along one film-positioning rail while allowing access to said display station for said film substrate along said other film-positioning rail.

3. The method of producing multiple image format film substrates as defined in claim 2 including mounting said film substrate in a holder sized to effectively equalize the peripheral dimension of said film substrate, to thereby contribute to said mounted film substrate assuming a proper operative position at said display station in either of its two orientations.

4. The method of producing multiple image format film substrates as defined in claim 3 including aligning vertically oriented film substrate-guiding surfaces in perpendicular relation to each other along each of said perpendicularly oriented movement paths of said display station, whereby said one surface is adapted to guide said film substrate during said one positioning movement therealong until abutment against said other surface, and said surfaces then function reversely during said other positioning movement.

* * * * *